United States Patent [19]

Lush

[11] Patent Number: 5,626,386
[45] Date of Patent: May 6, 1997

[54] AIR COOLED/HEATED VEHICLE SEAT ASSEMBLY

[75] Inventor: Michael E. Lush, Waterford, Mich.

[73] Assignee: Atoma International, Inc., Newmarket, Canada

[21] Appl. No.: 680,667

[22] Filed: Jul. 16, 1996

[51] Int. Cl.[6] .................................................. A47C 7/72
[52] U.S. Cl. ............... 297/180.13; 297/248; 297/452.47; 297/344.1
[58] Field of Search ................................. 297/248, 232, 297/344.1, 452.42, 452.43, 452.46, DIG. 1, DIG. 3, 180.13, 180.14, 354.1, 180.1, 452.47, 344.18, 452.48; 454/120; 62/261

[56] References Cited

U.S. PATENT DOCUMENTS

| | | |
|---|---|---|
| 1,475,912 | 11/1923 | Williams . |
| 1,568,471 | 1/1926 | Roemer . |
| 1,903,037 | 3/1933 | Fraver . |
| 2,022,959 | 12/1935 | Gordon . |
| 2,198,532 | 4/1940 | Gieleghem ........................ 297/344.1 X |
| 2,826,135 | 3/1958 | Benzick . |
| 2,912,832 | 11/1959 | Clark ..................................... 62/261 X |
| 2,978,972 | 4/1961 | Hake ................................ 297/180.13 X |
| 2,992,604 | 7/1961 | Trotman et al. . |
| 3,030,145 | 4/1962 | Kottemann . |
| 3,137,523 | 6/1964 | Karner ................................... 297/180.13 |
| 3,550,523 | 12/1970 | Segal . |
| 4,002,108 | 1/1977 | Drori . |
| 4,259,896 | 4/1981 | Hayashi et al. . |
| 4,413,857 | 11/1983 | Hayashi ........................... 297/180.13 X |
| 4,853,992 | 8/1989 | Yu . |
| 4,997,230 | 3/1991 | Spitalnick ........................ 297/180.13 X |
| 5,002,336 | 3/1991 | Feher ................................... 297/180.13 |
| 5,370,439 | 12/1994 | Lowe et al. .................... 297/180.13 X |
| 5,385,382 | 1/1995 | Single, II et al. ................ 297/180.13 |
| 5,416,935 | 5/1995 | Nieh .............................. 297/180.13 X |

FOREIGN PATENT DOCUMENTS

| | | |
|---|---|---|
| 637851 | 3/1962 | Canada . |
| 3306871A1 | 8/1984 | Germany . |
| 62-191212 | 8/1987 | Japan . |
| 5-23235 | 2/1993 | Japan . |
| WO95/14899 | 6/1995 | WIPO . |

*Primary Examiner*—Milton Nelson, Jr.
*Attorney, Agent, or Firm*—Cushman Darby & Cushman Intellectual Property Group of Pillsbury Madison & Sutro LLP

[57] ABSTRACT

A vehicle seat assembly includes a seat frame structure having a riser and a movable portion movable in relation to the riser in fore and aft directions with respect to a longitudinal axis of a vehicle. A seat cushion assembly including an open-cell foam seat cushion is mounted on the movable portion. The seat cushion includes a plurality of air channels therein extending from a bottom surface to a top surface thereof. The seat cushion is of sufficient thickness and density to support an occupant thereon. The seat cushion assembly includes a seat cushion cover material covering at least the top surface of the seat cushion. The seat cushion cover material is constructed and arranged to permit air to pass therethrough. A seat back frame is coupled to the movable portion of the frame structure. A seat back pad assembly is mounted on the seat back frame. Air flow directing structure is adapted to be coupled to a source of forced air and has a portion constructed and arranged to be mounted on the floor of the vehicle.

15 Claims, 7 Drawing Sheets

AIR COOLED/HEATED VEHICLE SEAT ASSEMBLY

BACKGROUND OF THE INVENTION

The present invention relates generally to a vehicle seat assembly, and more particularly to a vehicle seat assembly which may be heated or cooled by forced air directed through the cushions of the seat assembly.

When a conventional vehicle seat is exposed to a warm ambient temperature, the seat may attain a high temperature. Further, after the occupant of the vehicle is seated on the seat, the occupant may quickly become uncomfortable as the heat held by the seat is trapped between the occupant's body and the seat. Even after the vehicle's air conditioning system has cooled the vehicle's interior, the heat trapped between the seat and the occupant is ever present, causing the occupant to perspire. This moisture becomes a primary source of discomfort to the occupant. The moisture build up between the seat and the occupant increases with the length of time the occupant is seated on the seat. The moisture is most noticeable upon exiting the vehicle, when the occupant has the chance to actually feel his or her dampened clothing.

In colder temperatures, the conventional vehicle seats can be uncomfortably cold for a period of time. After the vehicle's interior has heated up, the occupant's body may lose a significant amount of heat, and subsequently, the occupant may be uncomfortable until the heat can be replaced.

Molded foam vehicle seating is especially susceptible to the above-mentioned problems since a barrier film, necessary for molding, lies approximately five millimeters below the seat covering material or fabric surface. Thus, even if the material covering the foam is air permeable, the seat will not "breath," due to the film barrier layer. When covering material such as leather is used to cover the foamed cushion, the leather must be punctured so as to permit air to pass therethrough enabling the seat to breath. However, even seats that can breath still cause the above-mentioned discomfort to the occupant since sufficient heating or cooling of the seat cannot occur.

Accordingly, there exists a need to provide a vehicle seating assembly which permits air flow through the seat cushion structure to heat or cool the seat and to provide a flow of air to reach the occupant seated on the seat to reduce moisture between the occupant and the seat.

SUMMARY OF THE INVENTION

It is an object of the invention to provide a vehicle seating assembly to fulfill the need referred to above. In accordance with the principles of the present invention, this objective is obtained by providing a vehicle seat assembly including a seat frame structure having a riser constructed and arranged to be fixedly mounted on a floor of a vehicle, and a movable portion constructed and arranged to be movable in relation to the riser in fore and aft directions with respect to a longitudinal axis of the vehicle.

A seat cushion assembly including an open-cell foam seat cushion is mounted on the movable portion. The seat cushion has a top surface and a bottom surface and includes a plurality of air channels therein extending generally from the bottom surface to the top surface to direct air to the top surface of the seat cushion. The seat cushion is of sufficient thickness and density to support an occupant thereon. The seat cushion assembly includes a seat cushion cover material covering at least the top surface of the seat cushion. The seat cushion cover material is constructed and arranged to permit air to pass therethrough.

A seat back frame is coupled to the movable portion of the frame structure. A seat back pad assembly including an open-cell foam seat back pad is mounted on the seat back frame. The seat back pad has a front surface and a rear surface and has a thickness and density generally equal to the thickness and density of the seat cushion. The seat back pad includes a plurality of air channels therein extending generally from the rear surface to the front surface to direct air to the front surface of the seat back pad. The seat back pad assembly includes a seat back cover material covering at least the front surface of the seat back pad. The seat back cover material is constructed and arranged to permit air to pass therethrough.

Air flow directing structure is adapted to be coupled to a source of forced air and has a portion constructed and arranged to be mounted on the floor of the vehicle. The air flow directing structure is operatively associated with the seat cushion assembly and seat back pad assembly so as to direct forced air (1) through the open cells of the seat cushion and of the seat back pad so as to change a temperature of the seat cushion and of the seat back pad, and (2) through the channels in the seat cushion and the channels in the seat back pad and through the seat cushion cover material and the seat back cover material. The air flow directing structure is constructed and arranged to accommodate the fore and aft movement of the movable portion of the frame structure.

Another object of the present invention is the provision of a seating assembly of the type described, which is simple in construction, effective in operation and economical to manufacture and maintain.

These and other objects of the present invention will become apparent during the course of the following detailed description and appended claims.

The invention may be best understood with reference to the accompanying drawings wherein an illustrative embodiment is shown.

DETAILED DESCRIPTION OF THE PRESENTLY PREFERRED EXEMPLARY EMBODIMENT

Figure 1:
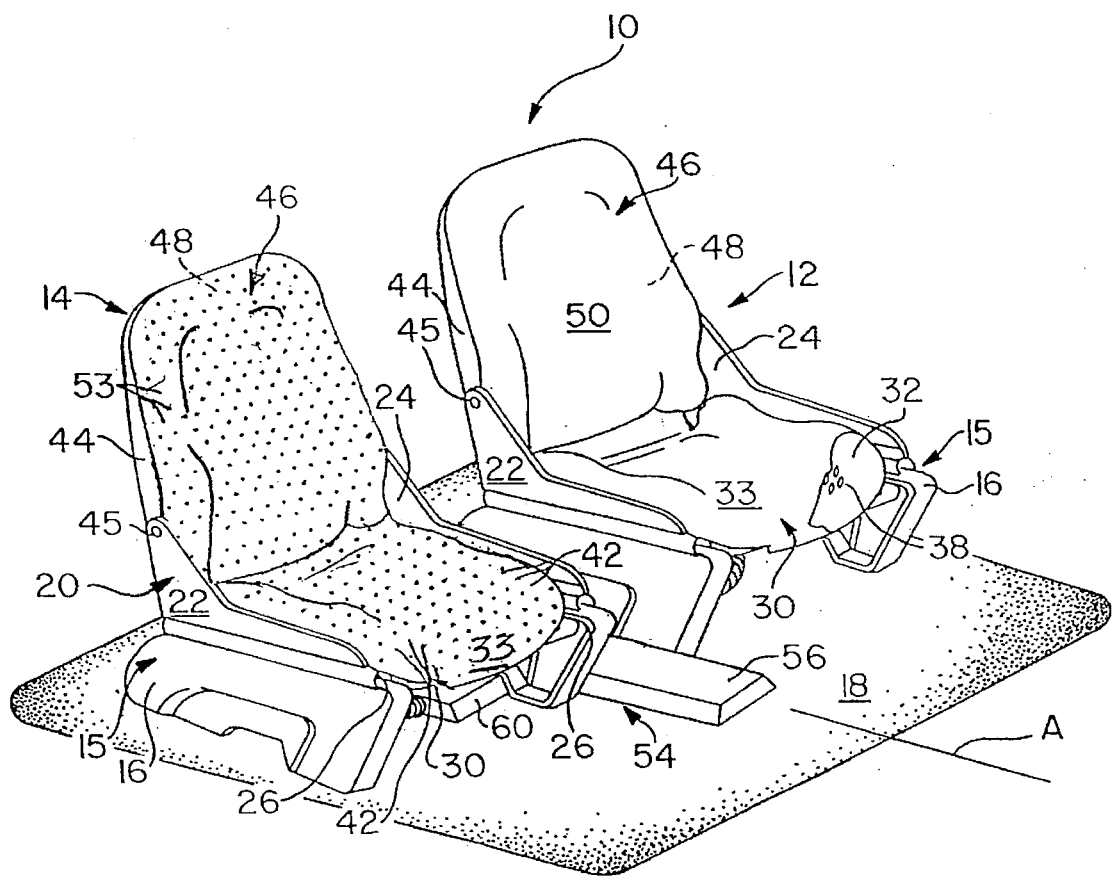
FIG. 1 is a perspective view of a vehicle seating assembly embodying the principles of the present invention, shown mounted in an operative position with respect to a vehicle floor, with remainder of the vehicle omitted for clarity of illustration.

Referring now more particularly to the drawings, there is shown therein a vehicle seating assembly, generally indicated at 10, which embodies the principles of the present invention. In the illustrated embodiment, the assembly 10 includes a driver's seat 12 and an adjacent passenger's seat 14. Each seat is generally identical and includes a seat frame structure, generally indicated at 15, including a riser 16 constructed and arranged to be fixedly mounted within the passenger compartment of a vehicle on the vehicle floor 18. The frame structure 15 includes a movable portion, generally indicated at 20, including a pair of spaced supports, 22 and 24 which are mounted for movement with respect to an associated riser 16. In the illustrated embodiment, each of the supports 22 and 24 is mounted so as to be slidable along tracks 26 of the riser 16, in fore and aft directions with respect to a longitudinal axis A of the vehicle. The movable portion 20 of each seat 12 and 14, also includes a seat pan 28 mounted between the supports 22 and 24 so as to be movable therewith.

Figure 8:
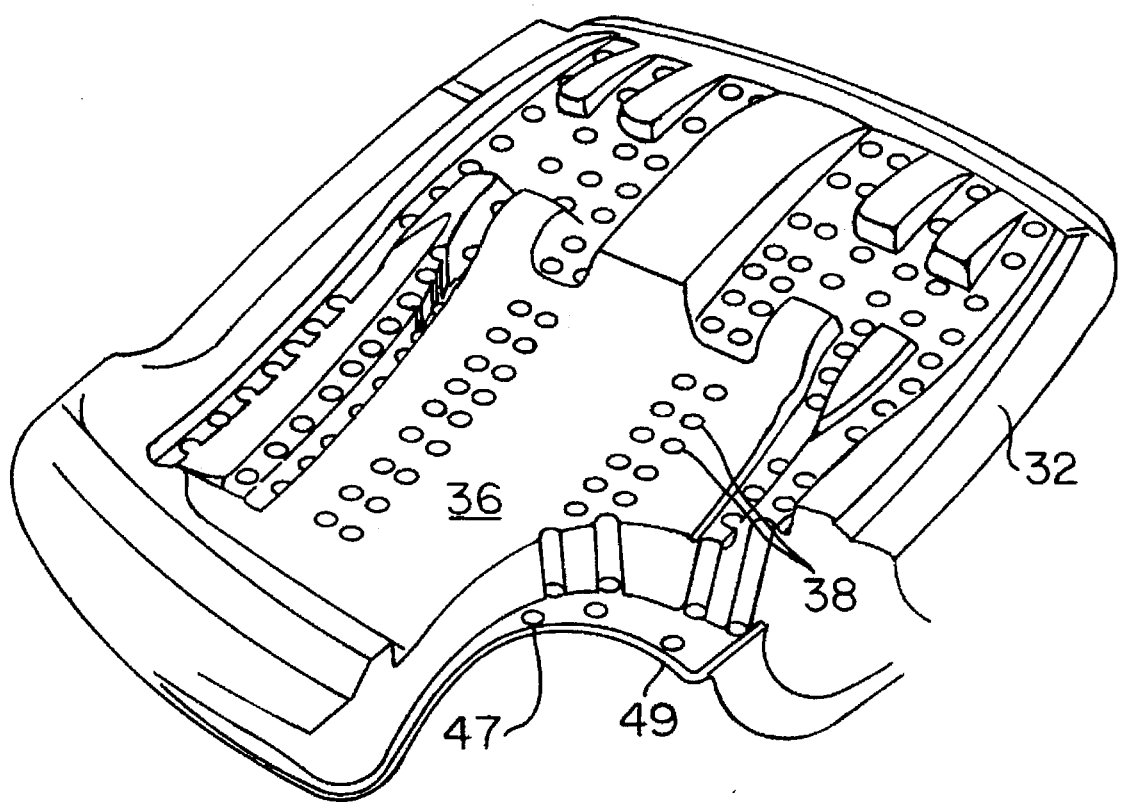
FIG. 8 is a perspective view of a seat cushion bottom showing venting channels therethrough.

In the illustrated embodiment, a seat cushion assembly, generally indicated at 30, including a molded, open cell foam seat cushion 32 (FIG. 8) and a cover material 33 is mounted on each seat pan 28. The seat cushion assemblies are identical and thus, only one will be described in detail. The seat cushion 32 has a top surface 34 and an opposing bottom surface 36, with a plurality of air channels 38 extending generally from the bottom surface 36 to the top surface 34 thereof. As shown in FIG. 8, the plurality of air channels 38 are arranged in the seat cushion 32 such that the channels 38 correspond generally to a leg engaging area of the occupant. Thus, when air is forced through the channels 38 and through the cover material 33, moisture between the cover material 33 and the occupant's legs can be prevented, as will be explained more fully below.

The seat cushion 32 with the channels 38 therein is of sufficient thickness and density to support an occupant thereon.

While the preferred embodiment described above utilizes only open cell foam, it is within the contemplation of the present invention to utilize spring supported open cell foam in accordance with conventional practice. This applies to the seat back cushion as well.

The seat cushion cover material 33 covers at least the top surface 34 of the seat cushion 32. The seat cushion cover material 33 is preferably made of cloth or other air permeable fabric. If the cover material 33 is leather or other impermeable material, the leather must include perforations 42 (FIG. 1) therein so as to permit air to flow therethrough. An exemplary perforation pattern is formed by a series of round holes approximately 0.03 inches in diameter disposed in a series of straight rows. The holes of each row are spaced apart approximately 0.36 inches. The rows are spaced apart approximately 0.35 inches. The holes of every other row are aligned and the holes of adjacent rows are equally offset. Another exemplary perforation pattern is formed by groups of three round holes each approximately 0.03 inches in diameter. A group of three holes are formed centrally in every other square of a grid of imaginary perpendicular parallel lines spaced apart approximately 0.25 inches. Each group of three includes two holes spaced apart approximately 0.12 inches and a third spaced approximately 0.15 inches from the two.

It is within the contemplation of the invention to provide a cover material which may include a fabric covering a thin foam layer, which ultimately covers at least a portion of the seat cushion. When the cover material includes the foam layer, both the foam layer and covering must be constructed and arranged to permit air to pass therethrough.

If the seat cushion assembly is molded from foam, having a film barrier 49 (FIG. 8) beneath the cover material 33, which is required for the molding process, the barrier 49 must be punctured or must include perforations 47 so as to permit air to flow therethrough. Further, the foamed seat cushion 32 should have open cells to permit air to pass through the open cells for conditioning the cushion, as will be explained in more detail below. With molded foam cushions, it is necessary to open the cells of the cushion after molding. This can be done by performing a crushing operation on the foam cushion and then permitting the cushion to return to its molded shape.

A seat back frame 44 is pivotally coupled to the supports 22 and 24 of the movable portion 20 of an associated seat frame structure at pins 45. A seat back pad assembly, generally indicated at 46, is mounted on the seat back frame 44. The seat back pad assembly 46 includes an open-cell foam seat back pad 48 and a seat back cover material 50 covering at least a front surface of the seat back pad 48. The seat back pad 48 has a rear surface opposing the front surface thereof and has a thickness and density generally equal to the thickness and density of the seat cushion 32 so as to sufficiently support the back of the occupant.

As with the seat cushion 32, the seat back pad 48 includes a plurality of air channels 52 (FIG. 2) therein extending generally from the rear surface to the front surface thereof to direct air to the front surface of the seat back pad 48. The seat back cover material 50 is the same material as the cover material 33 and is constructed and arranged to permit air to pass therethrough.

Again, if the seat back pad assembly is a molded foam assembly, the film barrier provided therein must be punctured to permit air to pass therethrough. Also, if the cover material 50 is an impermeable material such as leather, as shown covering the passenger seat 14 in FIG. 1, the material must include perforations 53 similar to the perforations 42 previously described to permit air to pass therethrough.

Although, in the illustrated embodiment, molded foam seat cushion assemblies are shown, it is within the contemplation of the invention to provide seats made from any known process. For example, cut and sew type seat cushion assemblies and glued seat cushion assemblies may be employed, so long as they are constructed and arranged to permit forced air to flow from a rear portion of the seat to the front surface of the seat and through the cover material thereof for conditioning the seat cushion assembly.

The movable portion 20 of the seat frame structure 15 permits the seat pan 28 together with the seat cushion assembly 30 thereon and the seat back frame 44 and seat back pad assembly 46 thereon to be movable in relation to the riser 16 in fore and aft directions with respect to the longitudinal axis A of the vehicle. Further, the seat back frame 44 may be pivoted so as to fold forwardly to permit passengers to enter a rear compartment of the vehicle or may pivot rearwardly so as to be disposed in and inclined position. It is within the contemplation of the invention to provide at least the driver's seat 12 of the seat assembly 10 to be movable vertically as well as fore and aft to thus provide a seat with a conventional six-position adjustment.

Figure 2:
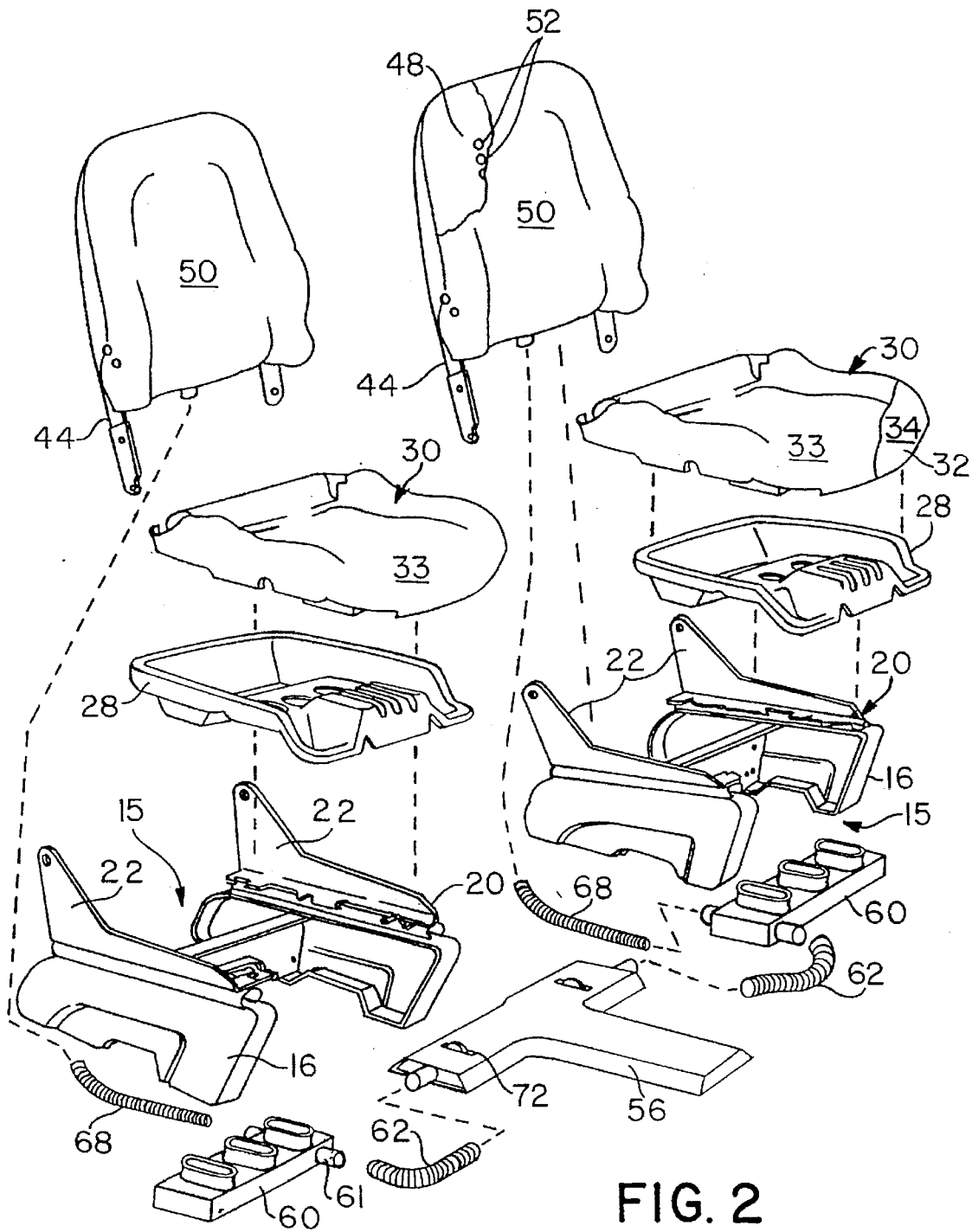
FIG. 2 is an exploded view of the vehicle seat assembly of FIG. 1.
Figure 3:
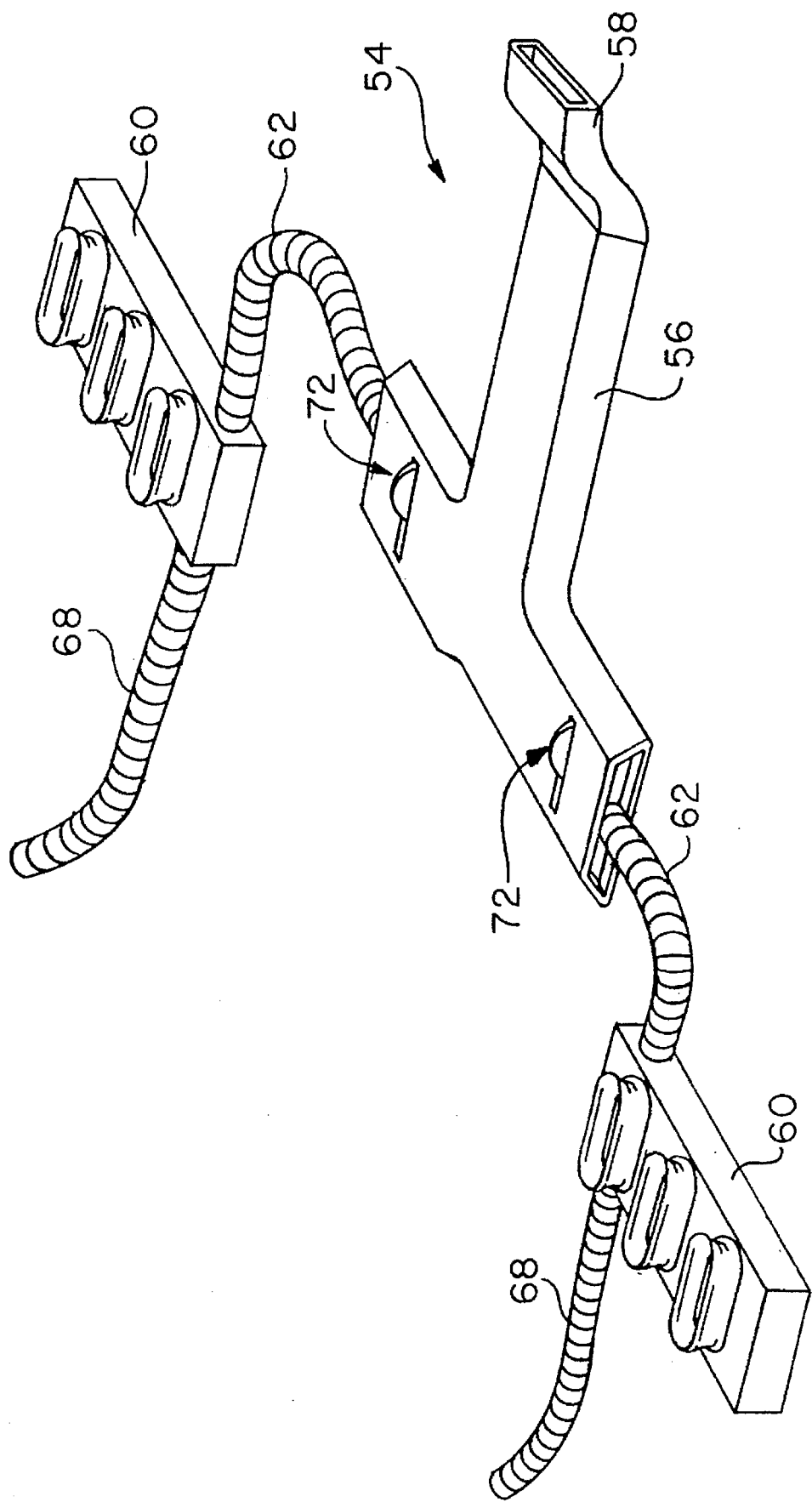
FIG. 3 is a perspective view of air flow directing structure of the assembly of FIG. 1.

With reference to FIGS. 2 and 3, air flow directing structure, generally indicated at 54, is provided and includes and air receiving member 56 constructed and arranged to be mounted on the vehicle floor 18. A forward portion 58 of the receiving member 56 is adapted to be coupled to a source of forced air such as the HVAC system of the vehicle. Alternatively, a separate source of forced air may be provided, such as a system mounted under at least one of the seats and coupled to the air receiving member 56. As shown, the air receiving member 56 is generally of T-shaped configuration defining an internal air chamber 57. The air flow directing structure includes a seat manifold 60 coupled to the seat pan 28 of each seat 12 and 14. Each manifold 60 is connected to an inlet 61 of the air receiving member 56 by a flexible hose 62 to accommodate the fore and aft movement of the associated seat.

Figure 4:
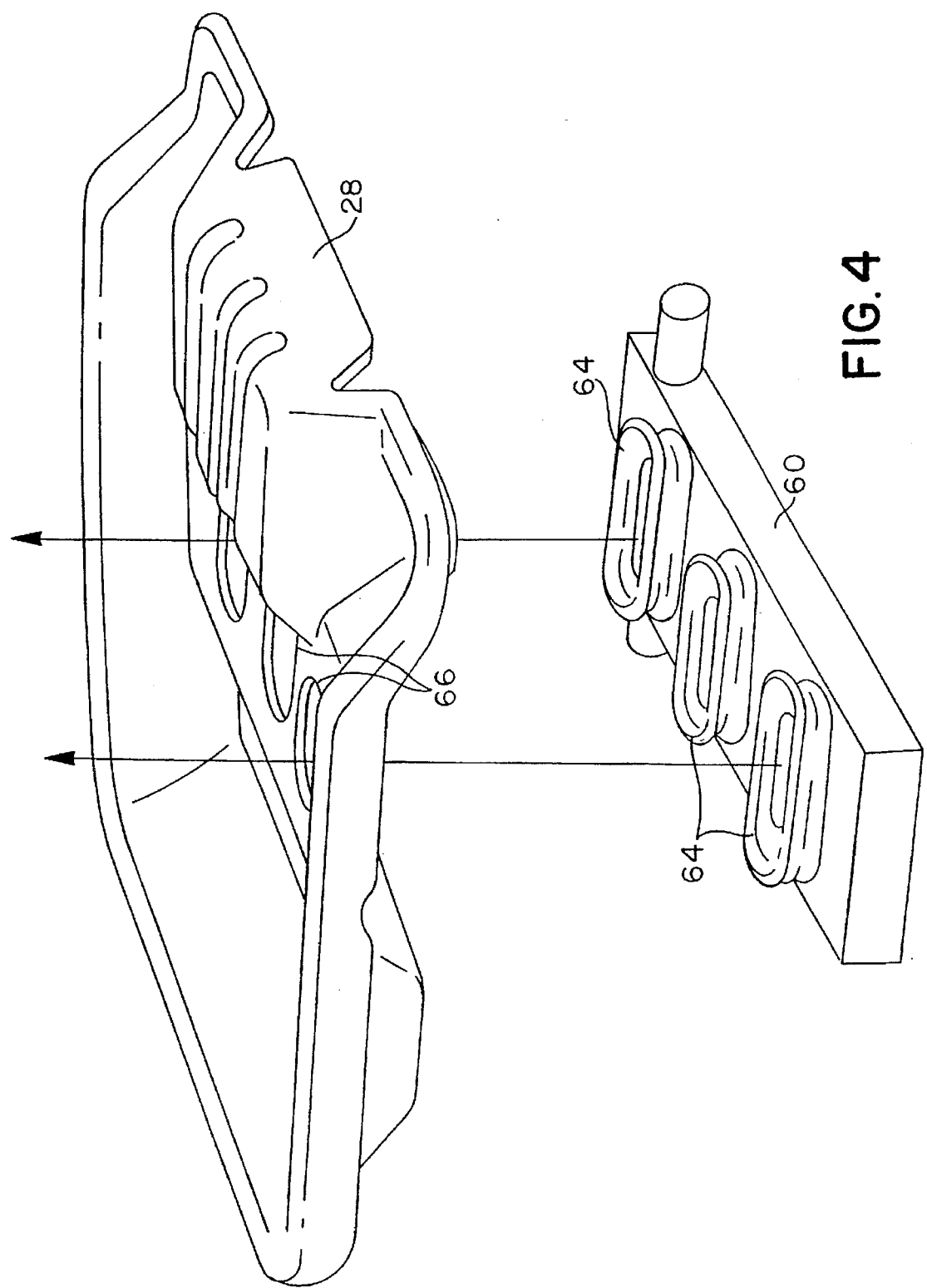
FIG. 4 is an exploded view of a seat manifold being coupled to a seat pan of a seat of the assembly of FIG. 1.

As shown in FIG. 4, in the illustrated embodiment, each of the seat manifolds 60 includes upwardly extending flexible members 64 which are engaged with holes 66 defined in the bottom of the seat pan 28. Thus, each seat manifold 60 is coupled to an associated seat pan 28 such that forced air directed from the source may flow through the air receiving member 56 and to each seat manifold 60, with the manifold 60 directing air upwardly through the seat cushion 32.

Figure 5:
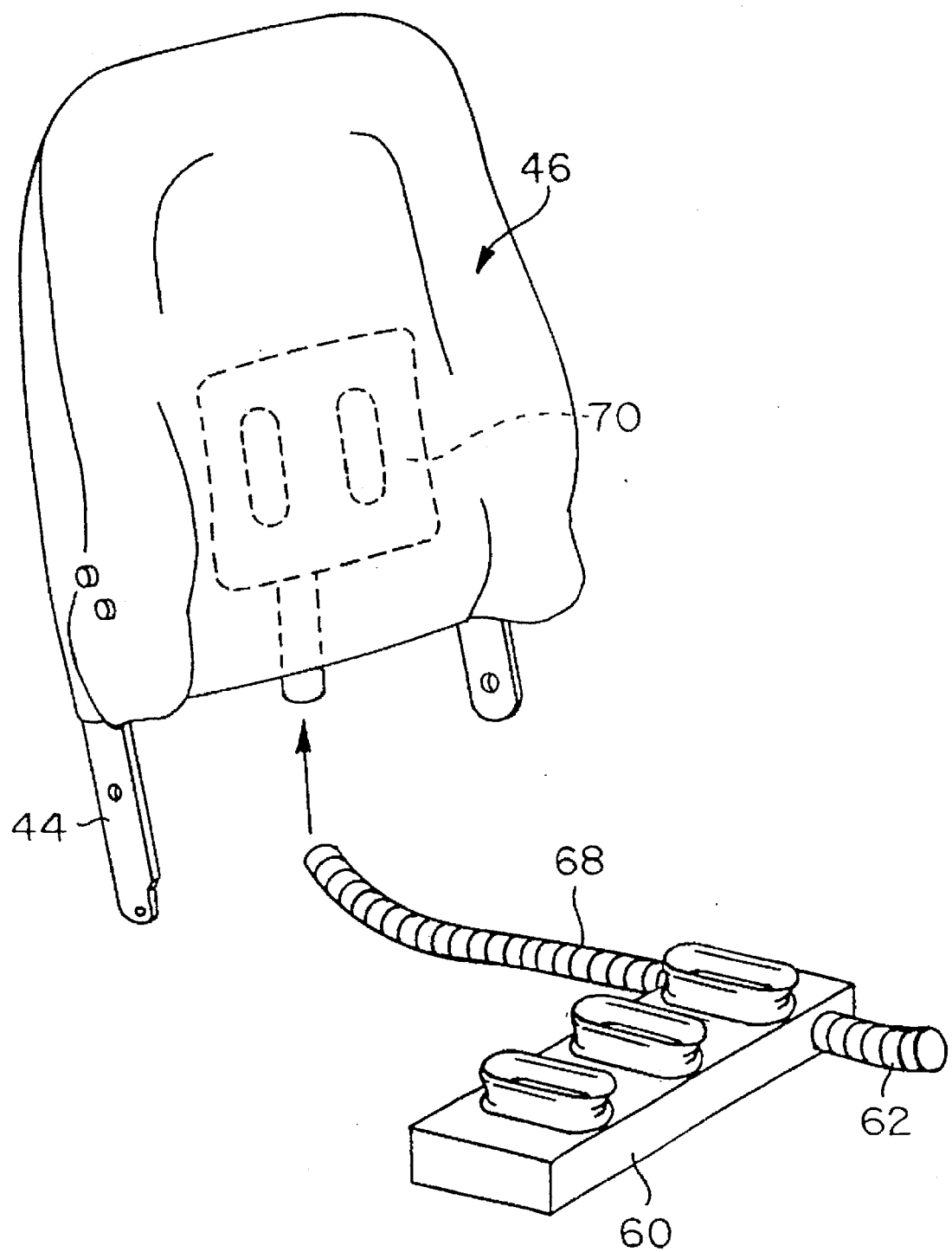
FIG. 5 is an exploded view of a seat manifold being attached to a seat back of a seat of the assembly of FIG. 1.

As shown in FIG. 5, a flexible hose 68 couples a seat manifold 60 to an associated seat back pad assembly 46 such that forced air may flow through the seat manifold to the seat back pad 48. In the illustrated embodiment, the air flow directing structure includes a seat back manifold 70 sewn into the seat back pad assembly 46 and coupled to the flexible hose 68 such that forced air from the seat manifold 60 is directed to the seat back manifold 70. The seat back manifold 70 then directs the air from the rear surface of the seat back pad 48 to the front surface thereof.

Figure 7:
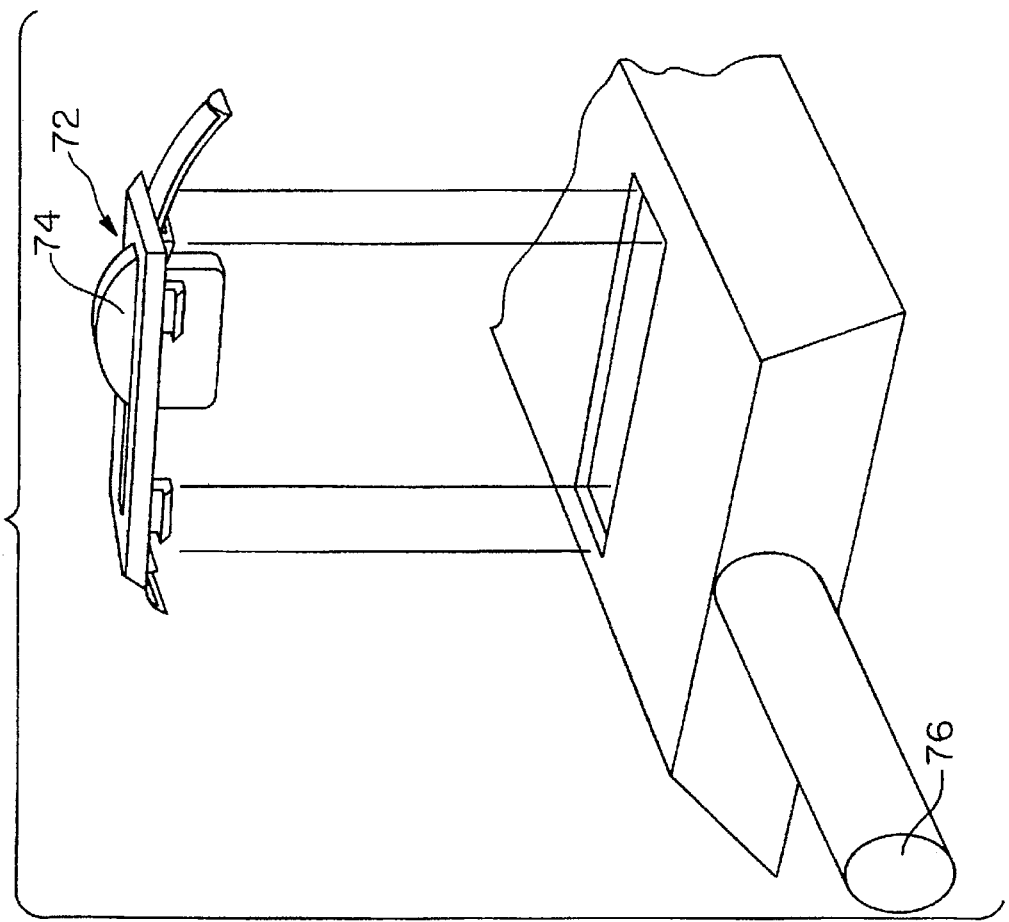
FIG. 7 is an exploded, perspective view of a portion of the air receiving member shown with the control member being inserted thereinto.
Figure 6:
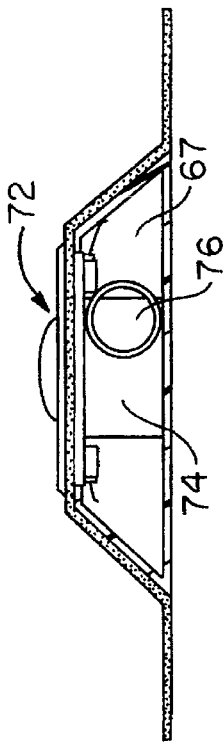
FIG. 6 is a schematic, sectional view of a control member of an air receiving member for controlling air flow to an associated seat.

With reference to FIG. 3, the air receiving member 56 includes a manually movable flow control member 72 mounted within the air chamber 67 and associated with each seat manifold 60 so as to control the flow of forced air from the air chamber to the associated seat. As shown in FIGS. 6 and 7, each flow control member 72 includes a sliding member 74 sealingly mounted with respect to the air receiving member 56 so as to be manually moved to open, close, or particularly close a passageway 76 which leads to the associated seat manifold 60. FIG. 6 is a sectional view showing the passageway 76 substantially closed by the sliding member 74. Thus, it can be appreciated that the driver and passenger can individually adjust the flow of forced air to their seat by moving the associated sliding member 74.

The operation of the seat assembly 10 will be appreciated below. As noted above, the air receiving member 56 may be coupled to a source of forced air, preferably the HVAC system of the vehicle. It is preferable to couple the air flow receiving member to the HVAC system since both heating and cooling can be provided to the seat assembly 10 and the temperature of the air can be controlled by the existing vehicle temperature controls. With reference to the drawings, when coupled to the vehicle's HVAC system, forced air can enter the T-shaped air receiving member 56. The air flow to either seat 12 and 14 can be controlled by the air control members 72. The air may then flow through the flexible tubes 62 and into the seat manifolds 60. Each seat manifold 60 then supplies the air to both the associated seat cushion 32 and to the associated seat back assembly 46 via the flexible tube 68. In the illustrated embodiment, the air directed to the seat cushion 32 flows from the seat manifold 60, which directs air to the channels 38 and to the bottom surface of the seat cushion 32. Thus, the air flows through the open cells of the seat cushion 32 so as to change a temperature of the seat cushion 32, and, the air flows through the channels 38 in the seat cushion 32 and through the cover material 33 to evaporate moisture which may accumulate between the cover material 33 and the occupant's legs.

Air is directed from each seat manifold 60 to the associated seat back manifold 70. The air flows from the seat back manifold 70 through the open cells of the seat back pad 48 to change the temperature of the seat back pad 48 and also flows through the channels 52 in the seat back pad 48 through the cover material 50 and ultimately to the occupant.

It can be appreciated that air will reach the cover materials 33 and 50 since air is being forced through the open cell foam seat cushion and seat back pad, respectively. The channels defined in the seat cushion and seat back pad reduce the time required to condition the temperature of the seat cushion or seat back pad and also reduce the time required for air to reach the cover materials.

From the foregoing, it can be appreciated that the seat back pad assembly 46 and the seat cushion assembly 30 can be cooled or heated to a comfortable temperature in as much time as is required to cool or heat the vehicle interior. When cooling is required, the air flowing through the cover material of each seat 12 and 14 may evaporate and dissipate any moisture built up during the initial cool down period, thereby preventing any further perspiring of the occupant. Since the entire seat is being conditioned due to the open cell construction of the foam seat cushion 32 and seat back pad 48, a comfortable seat temperature can be provided. Further, the assembly 10 is completely controllable, since the air flow to each seat can be regulated individually by throttling back the air flow and by adjusting the vehicle's HVAC control.

Although in the illustrated embodiment, a pair of bucket-type seats are shown, it is within the contemplation of the invention to provide the heating and cooling features of the invention to only one seat, such as the driver's seat 10. Further, the heating and cooling features may be employed in a bench seat or the like. With a bench seat, a seat pan may not be required and the forced air can be provided in any manner to the underside of the bench seat, and if desired, to the seat back of the bench seat. Further, although in the illustrated embodiment, the seat manifolds and the seat back manifolds are provided separately, they can be made part of seat pan or part of the seat back assembly, respectively.

Although the invention discloses air flow through both the seat cushion assembly and seat back pad assembly of each seat, it can be appreciated that air flow need not be provided to the seat back pad assembly, since most moisture or discomfort to the occupant is a result of improper temperature control of the seat cushion assembly.

While the invention has been described in connection with what is presently considered to be the most practical and preferred embodiment it is understood that the invention is not limited to the disclosed embodiment but on the contrary, is intended to cover various modifications and equivalent arrangements included within the spirit and scope of the appended claims.

What is claimed is:

1. A vehicle seat assembly comprising:

a seat frame structure having a riser constructed and arranged to be fixedly mounted on a floor of a vehicle, and a movable portion constructed and arranged to be movable in relation to said riser in fore and aft directions with respect to a longitudinal axis of the vehicle, a seat cushion assembly including an open-cell foam seat cushion mounted on said movable portion, said seat cushion having a top surface and a bottom surface and including a plurality of air channels therein extending generally from said bottom surface to said top surface to direct air to said top surface of said seat cushion, said seat cushion being of sufficient thickness and density to support an occupant thereon, said seat cushion assembly including a seat cushion cover material covering at least said top surface of said seat cushion, said seat cushion cover material being constructed and arranged to permit air to pass therethrough, a seat back frame coupled to said movable portion of said frame structure, a seat back pad assembly including an open-cell foam seat back pad mounted on said seat back frame, said seat back pad having a front surface and a rear surface and having a thickness and density generally equal to the thickness and density of said seat cushion, said seat back pad including a plurality of air channels therein extending generally from said rear surface to said front surface to direct air to said front surface of said seat back pad, said seat back pad assembly including a seat back cover material covering at least said front surface of said seat back pad, said seat back cover material being constructed and arranged to permit air to pass therethrough, and air flow directing structure adapted to be coupled to a source of forced air and having a portion constructed and arranged to be mounted on the floor of the vehicle, said air flow directing structure being operatively associated with said seat cushion assembly and seat back pad assembly so as to direct forced air (1) through the open cells of said seat cushion and the open cells of said seat back pad so as to change a temperature of said seat cushion and of said seat back pad, and (2) through said channels in said seat cushion and said channels in said seat back pad and through said seat cushion cover material and said seat back cover material, said air flow directing structure being constructed and arranged to accommodate the fore and aft movement of said movable portion of said frame structure.

2. The vehicle seat assembly according to claim 1, wherein the movable portion of said frame structure includes a seat pan, said seat cushion assembly being mounted on said seat pan, and wherein said air flow directing structure includes:

an air receiving member constructed and arranged to be mounted on the vehicle floor and to be coupled to the source of forced air, said air receiving member defining an air chamber, a seat manifold coupled to said seat pan, said seat manifold being in fluid communication with said air chamber and being coupled to said seat pan in such a manner that forced air flowing from said source and through said air chamber flows through said seat manifold to said seat cushion assembly, said seat manifold being in fluid communication with said seat back pad such that forced air may flow through said seat manifold to said seat back pad assembly, wherein said air receiving member includes a manually movable flow control member mounted in said air chamber, said flow control member being constructed and arranged to control a flow of forced air from said air chamber to said seat manifold.

3. The vehicle seat assembly according to claim 2, wherein said air flow directing structure includes a seat back manifold mounted with respect to said seat back pad assembly and fluidly connected to said seat manifold such that forced air flowing from said source and through said air chamber flows through said seat manifold to said seat back manifold and into communication with said seat back pad assembly.

4. The vehicle seat assembly according to claim 3, wherein said seat back frame is pivotally mounted to said movable portion of said frame structure, and said air flow directing structure includes a flexible hose fluidly connecting said air receiving member to said seat manifold so as to accommodate the fore and aft movement of the movable portion and thus the seat pan, and a flexible hose fluidly connecting said seat manifold to said seat back manifold so as to accommodate pivotal movement of said seat back relative to said movable portion.

5. The vehicle seat assembly according to claim 2, wherein said flow control member is mounted with respect to a passageway communicating said air chamber with said seat manifold, said flow control member being movable with respect to said passageway to alternately open, close or partially close said passageway.

6. The vehicle seat assembly according to claim 2, wherein said air receiving member is constructed and arranged to be coupled to a HVAC system of a vehicle.

7. The vehicle seat assembly according to claim 1, wherein said seat cushion cover material and said seat back cover material are each made from air permeable material.

8. The vehicle seat assembly according to claim 1, wherein said seat cushion cover material includes a plurality of perforations therein to permit air to pass therethrough.

9. The vehicle seat assembly according to claim 8, wherein said seat cushion cover material and said seat back cover material is leather.

10. The vehicle seat assembly according to claim 1, wherein said cover materials are air permeable and said seat cushion assembly and said seat back pad assembly are molded from foam and include a film layer between the foam and the associated cover material, said film having a plurality of perforations therein so as to permit air to pass through the film and through the associated cover material.

11. A vehicle seat assembly comprising:

a seat frame structure having a riser constructed and arranged to be fixedly mounted on a floor of a vehicle, and a movable portion constructed and arranged to be movable in relation with said riser in fore and aft directions with respect to a longitudinal axis of the vehicle, a seat cushion assembly including an open-cell foamed seat cushion mounted on said movable portion, said seat cushion having a top surface and a bottom surface and including a plurality of air channels therein extending generally from said bottom surface to said top surface to direct air to said top surface of said seat cushion, said seat cushion being of sufficient thickness and density for supporting an occupant thereon, said seat cushion assembly including a seat cushion cover material covering said top surface of said seat cushion, said seat cushion cover material being constructed and arranged to permit air to pass therethrough, a seat back frame coupled to said movable portion of said frame structure, a seat back pad assembly including a seat back pad mounted on said seat back frame and a seat back cover material covering a surface of said seat back pad, and air flow directing structure adapted to be coupled to a source of forced air and having a portion constructed and arranged to be mounted to the floor of the vehicle, said air flow directing structure being operatively associated with said seat cushion assembly so as to direct the forced air (1) through open cells of said seat cushion so as to change a temperature of said seat cushion, and (2) through said channels in said seat cushion and through said seat cushion cover material, said air flow directing structure being constructed and arranged to permit the fore and aft movement of said movable portion of said frame structure.

12. The vehicle seat assembly according to claim 11, wherein said seat back pad has a front surface and a rear surface and has a thickness and density generally equal to the thickness and density of said seat cushion, said seat back pad including a plurality of air channels therein extending generally from said rear surface to said front surface to direct air to said front surface of said seat back pad, said seat back cover material covering at least said front surface of said seat back pad, said seat back cover material being constructed and arranged to permit air to pass therethrough, said air flow directing structure being constructed and arranged to direct the forced air through open cells of said seat back pad so as to change a temperature of said seat back pad, and through said channels in said seat back pad and through said seat back pad cover material.

13. The vehicle seat assembly according to claim 12, wherein the movable portion of said frame structure includes a seat pan, said cushion assembly being mounted on said seat pan, and wherein said air flow directing structure includes:
an air receiving member constructed and arranged to be mounted on the vehicle floor and to be coupled to the source of forced air, said air receiving member defining an air chamber,
a first manifold coupled to said seat pan, said first manifold being in fluid communication with said air chamber and being coupled to said seat pan in such a manner that forced air flowing from said source and through said air chamber flows through said first manifold to said seat cushion assembly,
said first manifold being in fluid communication with said seat back pad such that forced air may flow through said first manifold to said seat back pad assembly,
wherein said air receiving member includes a manually movable flow control member mounted in said air chamber, said flow control member being constructed and arranged to control a flow of forced air from said air chamber to said first manifold.

14. A vehicle seat assembly comprising:
a pair of vehicle seats for mounting in spaced relation within a passenger compartment of a vehicle, each said seat comprising:
a seat frame structure having a riser constructed and arranged to be fixedly mounted on a floor of a vehicle, and a movable portion including a seat pan constructed and arranged to be movable in relation to said riser in fore and aft directions with respect to a longitudinal axis of the vehicle,
a seat cushion assembly including an open-cell foam seat cushion mounted on said seat pan, said seat cushion having a top surface and a bottom surface and including a plurality of air channels therein extending generally from said bottom surface to said top surface to direct air to said top surface of said seat cushion, said seat cushion being of sufficient thickness and density to support an occupant thereon, said seat cushion assembly including a seat cushion cover material covering at least said top surface of said seat cushion, said seat cushion cover material being constructed and arranged to permit air to pass therethrough,
a seat back frame coupled to said movable portion of said frame structure, and
a seat back pad assembly including an open-cell foam seat back pad mounted on said seat back frame, said seat back pad having a front surface and a rear surface and having a thickness and density generally equal to the thickness and density of said seat cushion, said seat back pad including a plurality of air channels therein extending generally from said rear surface to said front surface to direct air to said front surface of said seat back pad, said seat back pad assembly including a seat back cover material covering at least said front surface of said seat back pad, said seat back cover material being constructed and arranged to permit air to pass therethrough, air flow directing structure including:
an air receiving member adapted to be coupled to a source of forced air and constructed and arranged to be mounted on the floor of the vehicle,
a pair of seat manifolds, one seat manifold of the pair being coupled to a seat pan of an associated seat, each of said seat manifolds being in fluid communication with said air receiving member and being coupled to an associated seat pan in such a manner that forced air flowing from said source and through said air receiving member flows through each of said seat manifolds to said channels in an associated seat cushion to said top surface of the associated seat cushion and through said cover material of the associated seat cushion,
a pair of seat back manifolds, one seat back manifold of the pair being mounted with respect to an associated seat back pad assembly and being fluidly coupled to an associated seat manifold, each of said seat back manifolds being in fluid communication with said channels of an associated seat back pad such that forced air may flow through a seat manifold to the associated seat back manifold and to said channels of an associated said seat back pad to said front surface of the associated seat back pad and through the associated seat back pad cover material.

15. The vehicle seat assembly according to claim 14, wherein each said seat back frame is pivotally mounted to said movable portion of an associated frame structure, said air flow directing structure including a flexible hose fluidly connecting said air receiving member to an associated seat manifold so as to accommodate the fore and aft movement of the seat pan of an associated seat, and a flexible hose fluidly connecting an associated seat manifold to an associated seat back manifold so as to accommodate pivotal movement of said seat back relative to said movable portion.

* * * * *